United States Patent Office 2,724,725
Patented Nov. 22, 1955

2,724,725

PREPARATION OF PHOSPHINOTHIOIC HALIDES FROM PHOSPHINODITHIOIC ACIDS AND HYDROGEN HALIDES

Willis G. Craig, Willoughby, and William A. Higgins, Cleveland Heights, Ohio, assignors to The Lubrizol Corporation, Wickliffe, Ohio, a corporation of Ohio No Drawing. Application January 26, 1954,
Serial No. 406,326

10 Claims. (Cl. 260—543)

This invention is related to a novel method of preparing acid chlorides and acid bromides from acids of phosphorus and more particularly to a method for the preparation of acid chlorides and acid bromides of carbon to phosphorus bonded acids of phosphorus.

The acid chlorides and acid bromides of carbon to phosphorus bonded acids of phosphorus can be more exactly defined by the formula:

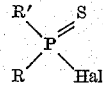

wherein R and R' are organic radicals bonded to phosphorus through a carbon, and Hal is either chlorine or bromine, preferably chlorine.

The preparation of phosphinothioic (thiophosphinic) chlorides and bromides has been effected in the past by sulfurization of the corresponding monohalophosphines. The monohalophosphines are, however, available only with difficulty and so, although conversion of the monohalophosphine to the phosphinothioic halide is relatively simple, the overall process is quite inconvenient.

It is accordingly an object of this invention to provide a novel and convenient method for the preparation of acid chlorides and acid bromides of carbon to phosphorus bonded acids of phosphorus. Because of their greater utility and cheapness, the acid chlorides are preferred. Other objects will be apparent from the following description.

It has been found, in accordance with the above object, that acid chlorides and acid bromides of carbon to phosphorus bonded acids of phosphorus can be prepared conveniently by a novel process which utilizes readily available phosphinothioic acids as starting materials. The process comprises heating a phosphinodithioic acid and treating said heated dithiophosphinic acid with hydrogen chloride or hydrogen bromide.

Broadly stated, this invention relates to the preparation of acid chlorides and acid bromides of carbon to phosphorus bonded acids of phosphorus having the formula:

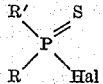

wherein R and R' are organic radicals directly bonded to phosphorus through a carbon atom, and Hal is chlorine or bromine; which comprises reacting at least one diorgano phosphinodithioic acid with hydrogen chloride or hydrogen bromide.

More particularly, this invention relates to the process for preparing acid chlorides and acid bromides of carbon to phosphorus bonded acids of phosphorus having the formula:

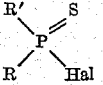

wherein R and R' are organic radicals directly attached to phosphorus through a carbon atom, and Hal is chlorine or bromine; which comprises reacting a diorgano phosphinodithioic acid having the formula:

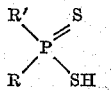

wherein R and R' are organic radicals directly attached to phosphorus through a carbon atom, with substantially anhydrous hydrogen chloride or hydrogen bromide. Those compounds in which R and R' in the above formulae are aromatic radicals are preferred, with special preference given to those in which R and R' are aromatic hydrocarbon radicals.

The term "diorgano phosphinodithioic acid" is used throughout this description to denote compounds having the structure:

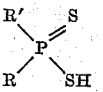

wherein R and R' are the same or different organic radicals, each bound to phosphorus through a carbon atom. Replacement of SH in the above structural formula by a halogen yields the corresponding acid halide. The phosphinodithioic acids are preferred as starting materials in the process, with special preference given those acids in which R and R' in the above formula are aromatic radicals and most desirably aromatic hydrocarbon radicals. Examples of R and R' in the above formula will be found in the following table.

TABLE 1

1. Aliphatic radicals, for example:

Alkyl radicals, e. g.:
  Methyl
  Ethyl
  Propyl (n- and iso-)
  Butyl (n-, sec-, iso-, and tert-)
  Amyl (n-, sec-, iso-, and tert-)
  Hexyl radicals, e. g.:
    n-Hexyl
    Sec-hexyl
    2,2-dimethyl-3-butyl
    2,2-dimethyl-4-butyl
    2,3-dimethyl-2-butyl
    2-methyl-1-pentyl
    2-methyl-2-pentyl
    3-methyl-1-pentyl
    3-methyl-2-pentyl, etc.
  Heptyl radicles, e. g.:
    n-Heptyl
    Sec-heptyl
    2,3-dimethyl-3-pentyl
    2,4-dimethyl-2-pentyl
    2,4-dimethyl-3-pentyl
    2,2,3-trimethyl-3-butyl
    3-ethyl-2-pentyl
    2-methyl-2-hexyl, etc.
  Octyl radicles, e. g.:
    n-Octyl
    2-ethyl-hexyl
    Diisobutyl
    Capryl
  Nonyl radicles, e. g.:
    Di-iso-butyl-carbinyl
    n-Nonyl
  Decyl radicles, e. g.: n-decyl
  Dodecyl radicles, e. g.: lauryl
  Tetradecyl radicles, e. g.: myristyl
  Hexadecyl radicles, e. g.: cetyl
  Octadecyl radicles, e. g.: stearyl Alkyl radicles having the formula
$C_nH_{2n+1}$ where n is an integer from 18 to 38 inclusive
E. g. those derived from paraffin wax, mineral oils and petrolatum Alkenyl radicles, e. g.:
  Vinyl
  Propenyl radicles, e. g.:
    Allyl
    Iso-propenyl
  Butenyl radicles, e. g.:
    n-Butenyl-1
    n-Butenyl-2
    n-Butenyl-3
    Iso-butenyl
  Pentenyl radicles, e. g.:
    n-Pentenyl-1
    n-Pentenyl-2
    n-Pentenyl-3
  Hexenyl radicles, e. g.:
    n-Hexenyl-1
    n-Hexenyl-2, etc.
    4,4-dimethyl-butenyl-2-
    3,4-dimethyl-butenyl-1, etc.
  Heptenyl radicles, e. g.: n-heptenyl
  Octenyl radicles, e. g.:
    n-Octenyl
    Diisobutenyl
  Nonenyl radicles, e. g.: n-nonenyl
  Decenyl radicles, e. g.: n-decenyl
  Dodecenyl radicles, e. g.:
    n-Dodecenyl
    Triisobutenyl
  Alkenyl radicles having the formula
    $C_nH_{2n-1}$ where n is an integer from 18 to 38 inclusive
    E. g. those derived from paraffin wax, mineral oils, and petrolatum 2. Cycloaliphatic radicles, for example:

Cycloalkyl radicles, e. g.:
  Cyclopentyl, alkylated-cyclopentyl,
  Cyclohexyl, and alkylated-cyclohexyl radicles, e. g.:
    Mono- and poly-methyl-cyclopentyl radicles
    Mono- and poly-methyl-cyclohexyl radicles
    Mono- and poly-ethyl-cyclohexyl radicles
    Mono- and poly-iso-propyl-cyclohexyl radicles
    Mono- and poly-tert-amyl-cyclohexyl radicles
    n-Octyl-cyclohexyl radicles
    Diisobutyl-cyclohexyl (i. e., "tert-octyl"-cyclohexyl) radicles
    Nonyl-cyclohexyl radicles
    Diiso-amyl-cyclohexyl radicles
    Lauryl-cyclohexyl radicles
    Cetyl-cyclohexyl radicles
  Naphthenyl radicles
  Hydroabietyl radicles
Cycloalkenyl radicles, e. g.:
  Cyclopentenyl, alkylated-cyclopentenyl,
  Cyclohexenyl, and alkylated-cyclohexenyl radicles, e. g.:
    Mono- and poly-methyl-cyclopentenyl radicles
    Mono- and poly-methyl-cyclohexenyl radicles
    Mono- and poly-ethyl-cyclohexenyl radicles
    Mono- and poly-iso-propyl-cyclohexenyl radicles
    Mono- and poly-tert-amyl-cyclohexenyl radicles
    n-Octyl-cyclohexenyl radicles
    Diisobutyl-cyclohexenyl radicles
    Nonyl-cyclohexenyl radicles
    Diiso-amyl-cyclohexenyl radicles
    Lauryl-cyclohexenyl radicles
    Cetyl-cyclohexenyl radicles
Dehydronaphthenyl radicles
Abietyl radicles 3. Aryl- and cycloalkyl-substituted aliphatic radicles, for example:

(a) Phenyl- and alkyl-phenyl-substituted alkyl radicles, e. g.:
  Benzyl
  Methyl-benzyl
  Capryl-benzyl
  Diisobutyl-benzyl
  Phenyl-ethyl
  Phenyl-propyl
  Phenyl-octadecyl (b) Xenyl- and alkyl-xenyl-substituted alkyl radicles, e.g.:
  Xenyl-methyl
  Capryl-xenyl-methyl
  Xenyl-ethyl
  Diisobutyl-xenyl-methyl (c) Naphthyl- and alkyl-naphthyl-substituted alkyl radicles, e. g.:
  Naphthyl-methyl
  Tert-amyl-naphthyl-methyl
  Naphthyl-ethyl
  Cetyl-naphthyl-ethyl (d) Cyclohexyl- and alkyl-cyclohexyl-substituted alkyl radicles, e. g.:
  Cyclohexyl-ethyl
  Methyl-cyclohexyl-ethyl
  Ethyl-cyclohexyl-ethyl
  Cyclohexyl-propyl
  Tert-amyl-cyclohexyl-butyl 4. Oxygen containing aliphatic and cycloaliphatic radicles, for example:

(a) Oxygen-containing aliphatic radicles, e. g.:
  Alkoxy-substituted alkyl radicles, e. g.:
    Propoxy-ethyl radicles, e. g.:
      n-Propoxy-ethyl
      Iso-propoxy-ethyl
    Butoxy-ethyl radicles, e. g.:
      n-Butoxy-ethyl
      Iso-butoxy-ethyl
      Tert-butoxy-ethyl
    Octoxy-ethyl radicles, e. g.:
      n-Octoxy-ethyl
      Diisobutoxy-ethyl
    Di-butoxy-propyl radicles, e. g.:
      2,3-di-n-butoxy-propyl
      3,3-di-iso-butoxy propyl
    Di-octoxy-propyl radicles, e. g.:
      3,3-di-n-octoxy-propyl
      2,3-bis-(diisobutoxy)-propyl
  Cycloalkoxy substituted alkyl radicles, e. g.:
    Cyclohexoxy-methyl
    Cyclohexoxy-ethyl radicles, e. g.:
      Beta-cyclohexoxy-ethyl
      Alpha-cyclohexoxy-ethyl
    Cyclohexoxy-butyl radicles, e. g.:
      2-(cyclohexoxy)-butyl
      2,3-di-cyclohexoxy-butyl
    Methyl-cyclohexoxy-propyl radicles, e. g.:
      2-(o-methyl-cyclohexoxy)-propyl
      2-(p-methyl-cyclohexoxy)-propyl
    Butyl-cyclohexoxy-ethyl radicles, e. g.:
      Beta-(p-tert-butyl-cyclohexoxy)-ethyl
      Alpha-(o-sec-butyl-cyclohexoxy)-ethyl
    Cyclopentoxy-ethyl radicles, e. g.:
      Alpha-cyclopentoxy-ethyl
      Beta-cyclopentoxy-ethyl
    Propyl-cyclopentoxy-methyl radicles, e. g.:
      Iso-propyl-cyclopentoxy-methyl radicles
      n-Propyl-cyclopentoxy-methyl radicles
  Alkenoxy-substituted alkyl radicles, e. g.:
    Propenoxy-ethyl radicles, e. g.:
      Allyloxy-ethyl
      Iso-propenoxy-ethyl Octenoxy-ethyl radicles, e. g.:
    Diisobutenoxy-ethyl
Di-octenoxy-propyl radicles, e. g.:
    2,3-bis-(diisobutenoxy)-propyl
Epoxy-alkyl radicles, e. g.:
    Epoxy-propyl
    Epoxy-butyl radicles, e. g.:
        2,3-epoxy-n-butyl
        3,4-epoxy-n-butyl
Carboalkoxy-alkyl radicles $$(R-O\overset{O}{\underset{\|}{C}}-R'-)$$

e. g.:
    Carbomethoxy-methyl $$(CH_3-O-\overset{O}{\underset{\|}{C}}-CH_2-)$$

Carboethoxy-ethyl
    Carbolauroxy-ethyl
Aroxy substituted alkyl radicles, for example
Phenoxy- and alkyl-phenoxy-substituted alkyl radicles, e. g.:
    Phenoxy-methyl
    Phenoxy-ethyl
    Cetyl-phenoxy-ethyl
    Phenoxy-phenethyl
    Capryl-phenoxy-phenethyl (b) Oxygen-containing cycloaliphatic radicles, e. g.:
    Alkoxy-, alkenoxy-, and aroxy-substituted cycloalkyl radicles
    Alkoxy-substituted cyclopentyl radicles, e. g.:
        Mono- and poly-ethoxy-cyclopentyl
        Octoxy-cyclopentyl radicles, e. g.:
            Diisobutoxy-cyclopentyl
    Alkoxy-substituted cyclohexyl radicles, e. g.:
        Mono- and poly-methoxy-cyclohexyl
        Octoxy-cyclohexyl radicles, e. g.:
            Diisobutoxy-cyclohexyl
    Alkenoxy-substituted cyclopentyl radicles, e. g.:
        Propenoxy-cyclopentyl radicles, e. g.:
            Allyloxy-cyclopentyl
            Iso-propenoxy-cyclopentyl
    Alkenoxy-substituted cyclohexyl radicles, e. g.:
        Vinyloxy-cyclohexyl
        Propenoxy-cyclohexyl radicles, e. g.:
            Allyloxy-cyclohexyl
            Iso-propenoxy-cyclohexyl
        Octenoxy-cyclohexyl radicles, e. g.:
            Diisobutenoxy-cyclohexyl
    Aroxy-substituted cyclopentyl radicles, e. g.:
        Phenoxy-cyclopentyl
        Poly-phenoxy-cyclopentyl radicles, e. g.:
            Di-phenoxy-cyclopentyl radicles
            Tetra-phenoxy-cyclopentyl radicles
        Ethyl-phenoxy-cyclopentyl radicles, e. g.:
            o-Ethyl-phenoxy-cyclopentyl
            p-Ethyl-phenoxy-cyclopentyl
        Naphthoxy-cyclopentyl
        Amyl-naphthoxy-cyclopentyl radicles, e. g.:
            Tert - amyl - alpha - naphthoxy - cyclopentyl radicles
            n - Amyl - beta - naphthoxy - cyclopentyl radicles
    Aroxy-substituted cyclohexyl radicles, e. g.:
        Phenoxy-cyclohexyl
        Poly-phenoxy-cyclohexyl radicles, e. g.:
            Di-phenoxy-cyclohexyl radicles
            Tri-phenoxy-cyclohexyl radicles
        Butyl-phenoxy-cyclohexyl radicles, e. g.:
            p-Tert-butyl-phenoxy-cyclohexyl
            n-Butyl-phenoxy-cyclohexyl
    Naphthoxy-cyclohexyl radicles, e. g.:
        Alpha-naphthoxy-cyclohexyl
        Beta-naphthoxy-cyclohexyl
    Methyl-naphthoxy-cyclohexyl radicles
    Propyl-naphthoxy-cyclohexyl radicles, e. g.:
        Iso - propyl - alpha - naphthoxy - cyclohexyl radicles
        n - Propyl - beta - naphthoxy - cyclohexyl radicles
    Epoxy-cycloalkyl radicles, e. g.:
        Epoxy-cyclopentyl
        Epoxy-cyclohexyl
    Carboalkoxy-cycloalkyl radicles, e. g:
        Carboethoxy-cyclopentyl

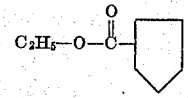

Carbomethoxy-cyclohexyl
        Carbolauroxy-cyclohexyl

5. Aliphatic and cycloaliphatic radicles containing inorganic elements. (Examples of such inorganic elements are: halogens; metals; metalloids, e. g.: selenium; silicon; sulphur.)

Examples of such radicles are:

(a) Aliphatic radicles containing inorganic elements, for example:
    Alkyl radicles containing halogen, e. g.:
        2-fluoro-ethyl
        2-chloro-ethyl
        2-iodo-ethyl
    Chloro-pentyl radicles, e. g.:
        5-chloro-n-pentyl
        3,5-di-chloro-n-pentyl
    Bromo-octyl radicles, e. g.:
        3-bromo-n-octyl
        3,4-di-bromo-n-octyl
    Alkenyl radicles containing halogen, e. g.:
        Chloro-propenyl radicles, e. g.:
            2-chloro-allyl
            Chloro-iso-propenyl
        Bromo-butenyl radicles, e. g.:
            4-bromo-crotyl
            4,4-di-bromo-crotyl
        Chloro-octenyl radicles, e. g.:
            Mono- and poly-chloro-diisobutenyl
    Alkyl radicles containing metal, e. g.:
        Radicles derived from metal alkoxides, e. g.:
            $M-O-(CH_2)_8-$
            $M-O-(CH_2)_{18}-$
        Radicles derived from metal alkylcarboxylates, e. g.:

$$M-O-\overset{O}{\underset{\|}{C}}-(CH_2)_{10}-$$

In which M represents one equivalent of a metal.
    Examples of such metals are:
        The alkali metals
        The alkaline-earth metals
        Cu and Ag
        Zn, Cd and Hg
        Al, Fe, Co, Ni
        Sn, Pb
        Sb, Bi
        Mn
Alkyl radicles containing silicon, e. g.:

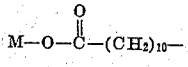

Alkyl radicles containing sulphur, e. g.:

$$C_2H_5-S-CH_2CH_2-$$

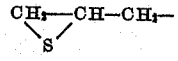

$C_2H_5-S_2-C_2H_4-$
$C_4H_9-S_2-C_4H_8-$
$C_8H_{17}-S_2-C_8H_{16}-$

Alkyl radicles containing selenium, e. g.:
$C_2H_5-Se-CH_2CH_2-$
$C_4H_9-Se-C_4H_8-$ (b) Cycloaliphatic radicles containing inorganic elements, for example:
Cycloalkyl- and alkylated-cycloalkyl radicles containing halogen, e. g.:
    Mono- and poly-chloro-cyclopentyl
    Mono- and poly-chloro methyl-cyclohexyl
    4-tert-amyl-2,6-di-bromo-cyclohexyl
    4-capryl-2-fluoro-cyclohexyl
    4-diisobutyl-2-iodo-cyclohexyl Cycloalkenyl- and alkylated-cycloalkenyl radicles containing halogen, e. g.:
    Mono- and poly-chloro-cyclopentenyl
    Mono- and poly-chloro-methyl-cyclohexenyl
    4-tert-butyl-2-bromo-cyclohexenyl
    4-capryl-2-fluoro-cyclohexenyl
    4-diisobutyl-2-iodo-cyclohexenyl Cycloalkyl radicles containing metal, e. g.:
    Radicles derived from metal cycloalkoxides, e. g.:

$$Na-O-CH\begin{array}{c}CH_2-CH_2\\ \diagup \quad \diagdown \\ \diagdown \quad \diagup \\ CH_2-CH_2\end{array}CH-$$

Radicles obtained on the removal of a hydrogen atom from the cycloaliphatic nucleus of, e. g.:
        Potassium cycloalkoxide of petroleum naphthenyl alcohol
        Lithium cycloalkoxide of hydroabietyl alcohol Radicles derived from metal cycloalkylcarboxylates, e. g.:

$$Na-O-\overset{O}{\underset{\parallel}{C}}-CH\begin{array}{c}CH_2-CH_2\\ \diagup \quad \diagdown \\ \diagdown \quad \diagup \\ CH_2-CH_2\end{array}CH-$$

Radicles obtained on the removal of a hydrogen atom from the cycloaliphatic nucleus of, e. g.:
        Sodium salt of petroleum naphthenic acids
        Lithium salt of hydroabietic acid Cycloalkyl radicles containing silicon, e. g.:

$$\left(CH_2\begin{array}{c}CH_2-CH_2\\ \diagup \quad \diagdown \\ \diagdown \quad \diagup \\ CH_2-CH_2\end{array}CH-O-\right)_3 Si-O-CH\begin{array}{c}CH_2-CH_2\\ \diagup \quad \diagdown \\ \diagdown \quad \diagup \\ CH_2-CH_2\end{array}CH-$$

Cycloalkyl radicles containing sulphur, e. g.:

$$C_2H_5-S-CH\begin{array}{c}CH_2-CH_2\\ \diagup \quad \diagdown \\ \diagdown \quad \diagup \\ CH_2-CH_2\end{array}CH-$$

Radicles obtained on the removal of a hydrogen atom from the cycloaliphatic nucleus of amyl thiol-naphthenate Cycloalkyl radicles containing selenium, e. g.:

$$CH_2\begin{array}{c}CH_2-CH_2\\ \diagup \quad \diagdown \\ \diagdown \quad \diagup \\ CH_2-CH_2\end{array}CH-Se-CH\begin{array}{c}CH_2-CH_2\\ \diagup \quad \diagdown \\ \diagdown \quad \diagup \\ CH_2-CH_2\end{array}CH-$$

6. Aromatic radicles, including aryl radicles, unsubstituted and substituted, including mono- and poly-alkylated and cyclo-alkylated aromatic nuclei, e. g.:

Phenyl
Cresyl
Xylyl
Mesitylene
Ethyl-phenyl
Di-ethyl-phenyl
Iso-propyl-phenyl
n-Propyl-phenyl
Tert-butyl-phenyl
Di-tert-butyl-phenyl
Iso-butyl-phenyl
n-Butyl-phenyl
Tert-amyl-phenyl
Cyclohexyl-phenyl
Methyl-cyclohexyl-phenyl
Capryl-phenyl
Diisobutyl-phenyl
Lauryl-phenyl
Cetyl-phenyl
Paraffin wax-substituted phenyl
Nitro-phenyl
Mono-chloro-phenyl
Poly-chloro-phenyl, e. g.:
    Dichloro-phenyl, trichloro-phenyl
Hydroxy phenyl
Acetyl-phenyl
Carbolauroxy-phenyl
Lauroxy-phenyl
Xenyl
Mono- and poly-chloro-xenyl
Capryl-xenyl
Phenoxy-phenyl
Thiophenoxy-phenyl
Diisobutyl-phenoxy-phenyl
Naphthyl
Mono- and poly-chloro-naphthyl
Cetyl-naphthyl
Anthracyl
Mono- and poly-chloroanthracyl
Phenanthryl
Mono- and poly-chloro-phenanthryl
Lauryl-phenanthryl
MO,Ph—R—
Where M is one equivalent of a metal (e. g. those listed under (5) above)
Ph is a benzene ring, and
R is a divalent aliphatic radicle, e. g.:
    Alkylane radicles, e. g.:
        Methylene
        Ethylene
        Propylene
        Etc.

Aromatic radicles having more than one kind of substituent, e. g.:
    Alkyl-hydroxy-aryl radicles, e. g.:
        Mono-methyl-hydroxy-phenyl radicles
        Poly-methyl-hydroxy-phenyl-radicles, e. g.:
            Di-methyl-hydroxy-phenyl radicles
            Tri-methyl-hydroxy-phenyl radicles
        Mono-ethyl-hydroxy-phenyl-radicles
        Poly-ethyl-hydroxy-phenyl radicles, e. g.:
            Di-ethyl-hydroxy-phenyl radicles
            Tri-ethyl-hydroxy-phenyl radicles
        Mono-butyl-hydroxy-phenyl radicles, e. g.:
            Tert-butyl-hydroxy-phenyl radicles
            Sec-butyl-hydroxy-phenyl radicles
        Poly-butyl-hydroxy-phenyl radicles, e. g.:
            Di-tert-butyl-hydroxy-phenyl radicles
        Mono-methyl-dihydroxy-phenyl radicles
        Poly-methyl-dihydroxy-phenyl radicles, e. g.:
            Di-methyl-dihydroxy-phenyl radicles
            Tri-methyl-dihydroxy-phenyl radicles
        Mono-propyl-hydroxy-naphthyl radicles, e. g.:
            Mono - isopropyl - alpha - hydroxy naphthyl radicles
        Poly-propyl-hydroxy-naphthyl radicles, e. g.:
            Di-n-propyl-beta-hydroxy-naphthyl radicles
    Alkyl-chloro-aryl-radicles, e. g.:
        Methyl-monochloro-phenyl radicles
        Methyl-polychloro-phenyl radicles, e. g.:
            Methyl-dichloro-phenyl radicles
            Methyl-trichloro-phenyl radicles Ethyl-monochloro-anthracyl radicles, e. g.:
Ethyl-monochloro-alpha-anthracyl radicles
Triethyl - monochloro - beta - anthracyl radicles
Ethyl-polychloro-anthracyl radicles, e. g.:
Ethyl-dichloro-alpha-anthracyl radicles
Diethyl-trichloro-beta-anthracyl radicles
Alkyl-nitro-aryl radicles, e. g.:
Methyl-nitro-phenyl radicles
Dimethyl-nitro-phenyl radicles
Ethyl-dinitro-phenyl radicles
Butyl-nitro-naphthyl radicles, e. g.:
Tert-butyl-nitro-naphthyl radicles
Sec-butyl-dinitro-naphthyl radicles
Propyl-nitro-phenanthryl radicles, e. g.:
Isopropyl-dinitro-phenanthryl radicles
Di-n-propyl-dinitro-phenanthryl radicles As indicated above, the phosphinodithioic acids employed in the process contain two organic radicles, each bound to phosphorus through a carbon atom. Although all such organic radicles are contemplated for the purposes of this invention, usually the nature of the organic radicles will be governed by the availability of phosphinothioic acids. Thus, di-aromatic phosphinothioic acids are conveniently available from the process described in copending application of Miller et al., for "Organic Dithiophosphinic Compounds, and Methods for Preparing Same," Serial No. 406,323, filed January 26, 1954, and owned by the same assignee. According to this process, the reaction of aromatic compounds with phosphorus pentasulfide to produce phosphinodithioic acids, is accomplished by means of the catalytic activity of aluminum halide. A large number of phosphinodithioic acids is conveniently available from such a process, and as a consequence, the phosphinothioic acids of this invention usually will include those which may be prepared by the process of the above described application. Other methods of preparing the phosphinic acids of this invention include: the reaction of a phosphorus sulfide and a Grignard reagent followed by hydrolysis to give the corresponding phosphinodithioic acid; and the sulfurization with free sulfur of secondary phosphines to give the corresponding phosphinodithioic acids. Any and all of the phosphinodithioic acids which are available from any of the above methods of preparation may be used as starting materials in the process described hereinafter.

Replacement of a mercapto group by a chlorine or bromine atom usually is accomplished by means of such strong chlorinating agents as thionyl chloride, thionyl bromide, phosphorus pentachloride, phosphorus pentabromide, phosphorus trichloride, phosphorus tribromide, etc. Thus, it is quite unexpected that such a relatively mild halogenating agent as hydrogen chloride or hydrogen bromide is effective in converting phosphinodithioic acids to the corresponding acid halides. Stronger halogenating agents than hydrogen chloride or hydrogen bromide may be used, if desired, to convert phosphinodithioic acids to the corresponding acid halides, but use of these stronger halogenating agents offers no advantage in yield and presents disadvantages in ease of processing, expense, etc. The use of hydrogen chloride or hydrogen bromide in the manner described herein provides an especially simple process.

The entire process is carried out in one reactor at atmospheric pressures and it is necessary only to bubble the substantially anhydrous hydrogen chloride or hydrogen bromide through the hot phosphinodithioic acid for a period of time generally ranging from 0.10 to 10 hours. The temperature is not critical in the range above 100° C. At this minimum temperature some acid halide is formed, but the rate of reaction is not high enough to allow an economical process and so the process will usually be carried out at higher temperatures, viz. 150–300° C. If the presence of unchanged hydrogen halide in the acid halide product is undesirable, the product may be flushed with an inert gas, such as nitrogen, to remove any dissolved hydrogen halide.

The invention is illustrated in detail by the following examples, which are illustrative only and are not to be considered as limiting in any way.

*Example 1*

Five hundred parts of diphenylphosphinodithioic acid was treated with a stream of hydrogen chloride at 100° C. for 90 minutes. A sample of the product mixture was shown by elementary analysis to contain 12.1 percent phosphorus, 25.7 percent sulfur and 1.4 percent chlorine. The residual product was treated again with a stream of hydrogen chloride for 90 minutes, this time at 150° C. A sample of this product was shown by elementary analysis to contain 12.0 percent phosphorus (theory 12.2 percent), 14.2 percent sulfur (theory 12.6 percent) and 11.9 percent chlorine (theory 14.0 percent), thus indicating it to be substantially pure diphenylphosphinodithioic acid chloride.

It is apparent from the above experiment that while a small amount of diphenylphosphinodithioic acid chloride is formed at 100° C. the reaction to produce this material proceeds much faster at 150° C. and is substantially complete within the 90-minute period.

*Example 2*

One thousand parts of diphenyl phosphinodithioic acid was treated with hydrogen chloride at 200° C. for two hours. The orange-brown, slightly viscous liquid was filtered and distilled at 190–210° C/3 mm. to yield 1008 parts of distillate which was shown by elementary analysis to have the following composition thus indicating it to be substantially pure diphenylphosphinodithioic chloride:

|  | P | S | Cl |
|---|---|---|---|
| Theory | 12.2 | 12.6 | 14.0 |
| Found | 12.9 | 11.4 | 13.5 |

*Example 3*

One hundred and sixty parts of di-(chlorophenyl) phosphinodithioic acid was heated at 170° C. while a stream of hydrogen chloride was bubbled through for six hours. The unreacted hydrogen chloride was removed by bubbling nitrogen through the hot mixture for one hour. This product was diluted with toluene and filtered. The filtrate was concentrated at 100° C/30 mm. to a dark crystalline mass which was shown by elemental analyses to contain 29.6 percent of chlorine (theory, 33.2 percent), 8.5 percent of phosphorus (theory, 10.7 percent) and 10.7 percent of sulfur (theory, 11.1 percent), thus indicating it to be substantially pure di-(chlorophenyl) phosphinothioic acid chloride.

*Example 4*

Eight hundred and forty parts of ditolyl phosphinodithioic acid was treated for 1.5 hours at 100° C. with hydrogen chloride, and a small sample (A) removed. The residue was treated for an additional 1.5 hours at 150° C. with hydrogen chloride and a second sample (B) removed. Again the residue was treated with hydrogen chloride for 1.5 hours, this time at 200° C. to form a third sample (C). Elemental analyses of samples (A), (B), and (C) gave the following results:

|  | Theory | A | B | C |
|---|---|---|---|---|
| P | 10.9 | 10.6 | 10.5 | 10.6 |
| S | 11.4 | 21.9 | 13.5 | 12.7 |
| Cl | 12.6 | .4 | 8.1 | 9.? |

It is apparent that (B) and (C) represent substantially pure diphenylphosphinodithioic chloride and that accordingly the synthesis of this material by the method outlined hereinbefore proceeds satisfactorily at temperatures 150° C. and 200° C. The presence of some chlorine in (A) indicates that the reaction to produce chlorophosphinothioates will take place at 100° C., although slowly.

*Example 5*

Seven hundred and seventy parts of ditolylphosphinodithioic acid was treated with hydrogen chloride at 170° C. for three hours, then with nitrogen at this temperature for an additional hour. The product was allowed to cool and after standing for 48 hours it had crystallized to a yellow solid. It was shown by elementary analyses to contain 12.5 percent of sulfur (theory, 11.4 percent), 10.6 percent of phosphorus (theory, 11.0 percent), and 9.3 percent of chlorine (theory, 12.6 percent), thus indicating that the product was substantially pure ditolyl phosphinothioic chloride.

*Example 6*

In a manner similar to that shown in Example 5, hydrogen bromide may be reacted with ditolyl phosphinodithioic acid to prepare ditolyl phosphinothioic bromide.

*Example 7*

One thousand parts of di-(chlorophenyl) phosphinodithioic acid was treated for 3.5 hours at 200° C. with hydrogen chloride and the resulting product mixture was distilled to yield 78 percent of the theoretical yield of a white, crystalline solid which distilled at 220° C./0.8 mm. The elementary analysis of the solid indicated the following: 10.3 percent of sulfur; 9.4 percent of phosphorus; and 32.7 percent of chlorine.

Other modes of applying the principle of the invention may be employed, change being made as regards the details described, provided the features stated in any of the following claims, or the equilavent of such, be employed.

We therefore particularly point out and distinctly claim as our invention:

1. The method for preparing phosphinothioic acid halides having the structure:

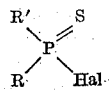

wherein R' and R are selected from the class consisting of the same and different non-functional organic radicals, each attached to phosphorus through a carbon atom, and Hal is a halide which comprises the steps of reacting at least one phosphinodithioic acid having the structure

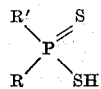

wherein R and R' are the same or different organic radicals attached to phosphorus through a carbon atom with substantially anhydrous hydrogen halide selected from the class consisting of hydrogen chloride and hydrogen bromide 2. The method of claim 1 further characterized in that said hydrogen halide is hydrogen bromide.

3. The method of claim 1 further characterized in that said hydrogen halide is hydrogen chloride.

4. The method of claim 1 further characterized in that the organic radicals are cyclic hydrocarbon radicals.

5. The method of claim 1 further characterized in that the organic radicals are acyclic hydrocarbon radicals.

6. The method of claim 1 further characterized in that the organic radicals are aryl radicals.

7. The method of claim 1 further characterized in that the organic radicals are inorganic-substituted aryl radicals.

8. The method of claim 1 further characterized in that the organic radicals are chloro-substituted aryl radicals.

9. The method for preparing acid halides of carbon to phosphorus bonded acids of phosphorus having the structure:

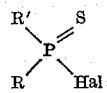

wherein R and R' are selected from the class consisting of the same and different non-functional aryl radicals, each attached to phosphorous through a carbon atom, and Hal is selected from the class consisting of chlorine and bromine, which comprises the steps of reacting at least one di-(aryl) phosphinodithioic acid with substantially anhydrous hydrogen halide selected from the class consisting of hydrogen bromide and hydrogen chloride.

10. The method of claim 9 further characterized in that said hydrogen halide is hydrogen chloride.

No references cited.